No. 678,212. Patented July 9, 1901.
G. E. ALPHIN.
FUMIGATING APPARATUS.
(Application filed Apr. 11, 1901.)
(No Model.) 2 Sheets—Sheet 1.

WITNESSES:
INVENTOR
G. E. Alphin.
BY
ATTORNEYS

No. 678,212. Patented July 9, 1901.
G. E. ALPHIN.
FUMIGATING APPARATUS.
(Application filed Apr. 11, 1901.)

(No Model.) 2 Sheets—Sheet 2.

UNITED STATES PATENT OFFICE.

GILBERT E. ALPHIN, OF MOUNT OLIVE, NORTH CAROLINA.

FUMIGATING APPARATUS.

SPECIFICATION forming part of Letters Patent No. 678,212, dated July 9, 1901.

Application filed April 11, 1901. Serial No. 55,310. (No model.)

*To all whom it may concern:*

Be it known that I, GILBERT E. ALPHIN, a citizen of the United States, residing at Mount Olive, in the county of Wayne and State of North Carolina, have made certain new and useful Improvements in Fumigating Apparatus, of which the following is a specification.

It is the object of my invention to provide a simple and cheap, but effective, apparatus for fumigating fruits, vegetables, milk, and other alimentary substances for the purpose of destroying noxious germs, and thereby preventing early deterioration or decay of the same. The apparatus may be made of any desired size and capacity; but my preferred embodiment is in a small compact portable form. Sulfur or other preferred chemical capable of emitting fumes is employed, and the latter are directed into contact with the articles to be treated, and finally into contact with water, by which they are wholly or partly condensed and absorbed. The water thus impregnated is subsequently used for preserving the article which has been treated. The details of construction, arrangement, and operation are as hereinafter described, and shown in the accompanying drawings, in which—

Figure 1:
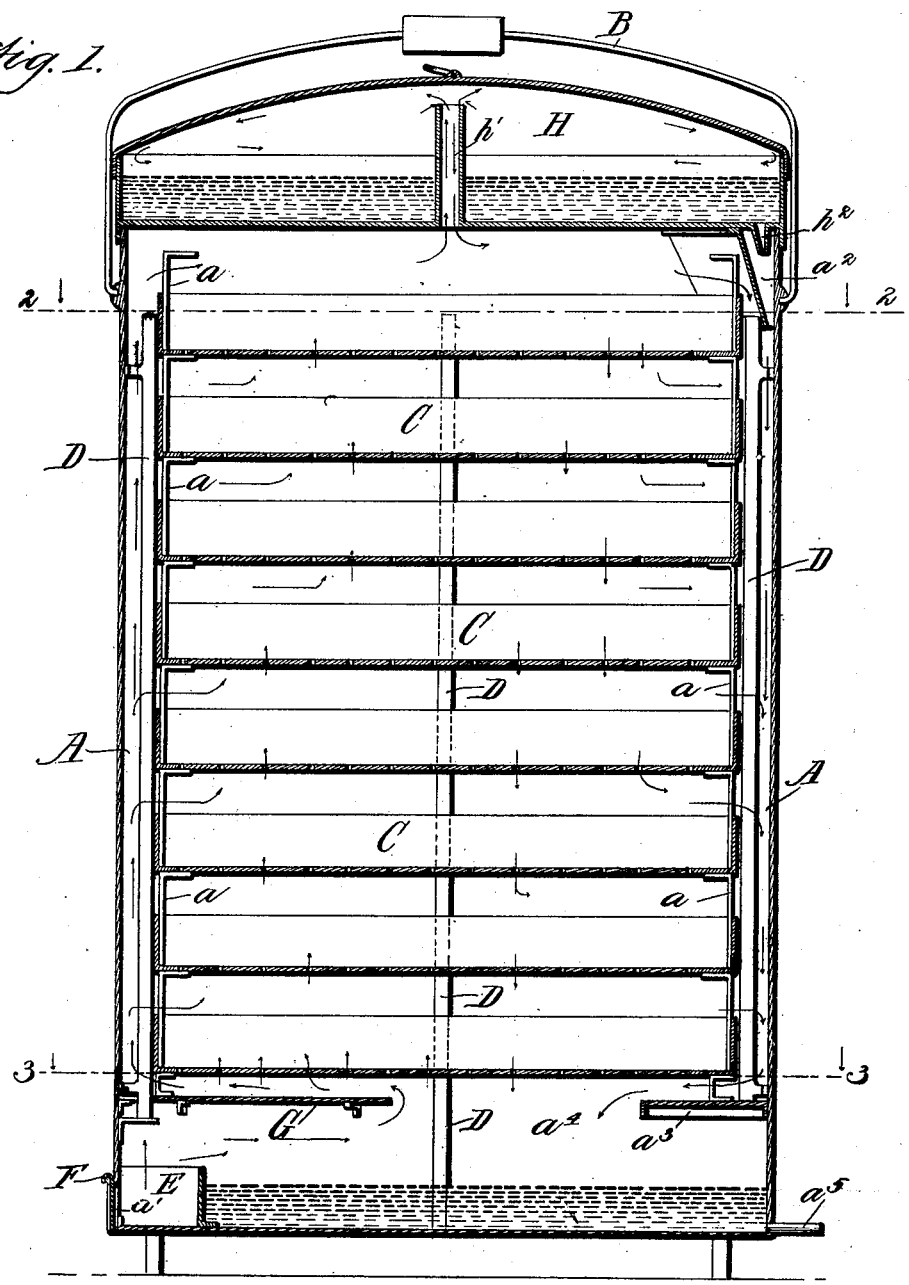
Figure 2:
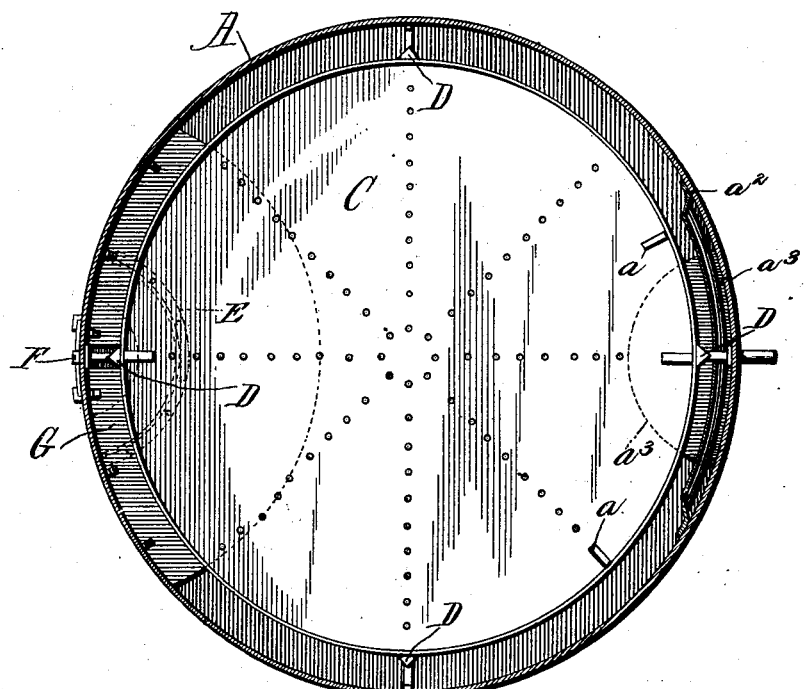
Figure 3:
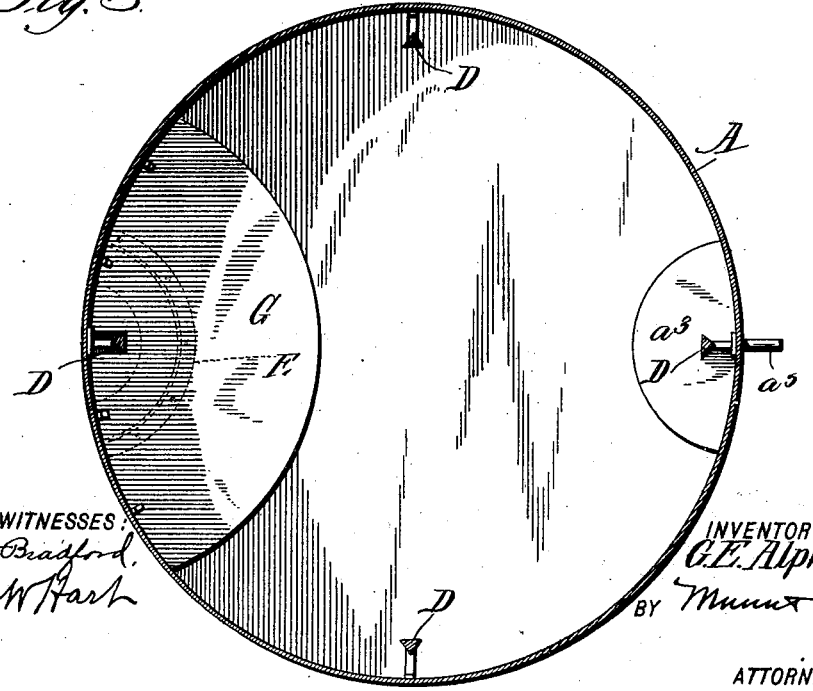

Figure 1 is a central vertical section of the apparatus. Figs. 2 and 3 are horizontal cross-sections on the lines 2 2 and 3 3, respectively, of Fig. 1.

The body A of the receptacle for fruit or other substances to be fumigated is preferably cylindrical and constructed of tinned sheet-iron or other thin metal. It is provided with a hinged bail or handle B, Fig. 1, by which it is adapted to be conveniently carried. A series of cylindrical sheet-metal pans or trays C are superposed one on another in the receptacle A and provided with perforated bottoms to allow free passage of fumes. Each pan A has vertical arms $a$, upon which the one above rests. These arms $a$ are preferably constructed of metal and provided with flanges at the top, or they may be constructed in any other suitable manner. To hold the superposed pans C in due vertical alinement, I arrange three or more triangular rods D vertically in the receptacle A, the same being placed equidistantly, as indicated in Fig. 2. The triangular form provides a broader surface of contact with the pans C than would be practicable with round rods. An annular space is left between the pans C and side wall of the receptacle A to allow circulation of fumes.

The sulfur or other germ-destroying chemical is placed in a compartment formed at the bottom of the receptacle A, adjacent to a lateral opening $a'$, by means of a low semicircular vertical partition E. The said opening $a'$ serves for admission of air, and the draft is regulated by a vertically-slidable door F. A plate G is arranged between this combustion-compartment and the lowest pan C to serve as a shield or fender, preventing access of undue heat to said pan. The said shield is separated from the pan by a space that permits due passage of fumes.

The top and cover H of the receptacle A consists of a water-chamber having a removable cover and a circumferential base-flange, whereby it is held in due position on the receptacle A, while adapted for convenient detachment. An open-ended pipe $h'$ projects upward centrally from the bottom of this waterholder, and a shorter pipe $h^2$ projects down from the bottom, adjacent to the side of receptacle A, and serves to discharge water into a half-funnel attachment $a^2$, secured to the receptacle and having a small opening at the bottom. It is essential that this opening shall equal or exceed that of the discharge-pipe $h^2$ in order to prevent overflow.

In using the apparatus the hollow top H is partly filled with water and the several pans or trays C with fruit or other article to be treated. The chemical substance being ignited in compartment E, the fumes pass up through the pans C in direct contact with the fruit and also around the sides of the pans and over the same, as indicated by arrows, Fig. 1, and then enter the water-holder H through its pipe $h'$, where they are condensed and absorbed by the water. The latter slowly escapes through the short pendent pipe $h'$ and discharges into the funnel $a^2$, whence it trickles down the inner side of the receptacle A and striking upon the horizontal shelf $a^3$, arranged below the lowermost pan C, falls into the chamber $a^4$, formed in the lower portion of the receptacle. In such fall from the shelf $a^3$ the water passes in further contact with the fumes and is saturated with the chemical. The water escapes by a short pipe $a^5$ and is saved for use in putting up the fruit, &c., in jars.

What I claim is—

1. A fumigating apparatus comprising a suitable receptacle having a bottom compartment for reception of a fume-emitting chemical, one or more holders arranged therein for the article to be treated, and a water-holder arranged upon and closing the top of said receptacle, and having a pipe projecting upward from the bottom, for conducting fumes above the surface of the water, and a water-discharge opening in said bottom, as shown and described.

2. A fumigating apparatus comprising a suitable receptacle, having a bottom compartment for a fume-emitting chemical, a lateral draft-opening, horizontal holders for the article to be treated, said holders being spaced from the side of the receptacle to allow access of fumes, and a superposed water-holder, having fume-admitting pipe and water-discharge arranged substantially as shown and described.

3. A fumigating apparatus comprising a suitable receptacle, having a bottom compartment for a fume-emitting chemical, a lateral draft-opening, horizontal holders for the article to be treated, said holders being provided with perforated bottoms for passage of fumes, and a water-holder superposed on the receptacle, and having a fume-admission pipe and water-discharge, as shown and described.

4. A fumigating apparatus comprising a suitable receptacle, having a bottom compartment for a fume-emitting chemical, a lateral draft-opening, horizontal holders for the article to be treated, said holders being provided with perforated bottoms for passage of fumes, and a water-holder superposed on the receptacle, and having a fume-admission pipe, and a water-discharge opening located adjacent to the side of the receptacle, as shown and described.

5. A fumigating apparatus comprising a receptacle having at the bottom a compartment for a fume-emitting chemical, an adjacent draft-opening and a water-discharge opening, and a funnel-like attachment serving as a water-receiver and guide arranged at the top and provided with a discharge-opening, a water-holder arranged on said receptacle and provided with a fume-emitting pipe and a water-discharge opening whose diameter is the same or less than that of the said attachment, and one or more holders for the article to be treated, substantially as shown and described.

6. A fumigating apparatus comprising a suitable receptacle, having a bottom compartment for a fume-emitting chemical, a lateral draft-opening, horizontal holders for the article to be treated, said holders being provided with perforated bottoms for passage of fumes, and a water-holder superposed on the receptacle, and having a fume-admission pipe and a water-discharge opening located adjacent to the side of the receptacle, a shelf located horizontally above the bottom of the receptacle and attached to the side thereof, and a lateral water-discharge below said shelf, substantially as shown and described.

7. A fumigating apparatus comprising a receptacle having a bottom chemical-compartment, and a series of pans or trays arranged therein and superposed, each having arms projecting upward and arranged to support the pan above and hold it duly spaced from the one below, and also serving as handles for use in inserting and removing the pans, as shown and described.

8. In a fumigating apparatus comprising the receptacle having a series of vertical rods arranged interiorly and spaced from the wall thereof, and a series of removable pans or trays adapted to be set and held between said rods, as shown and described.

GILBERT E. ALPHIN.

Witnesses:
W. M. MAXWELL,
ROBT. P. HOLMES.